T. H. GARLAND.
HEATING SYSTEM.
APPLICATION FILED NOV. 5, 1915.
1,243,154.
Patented Oct. 16, 1917.
4 SHEETS—SHEET 1.
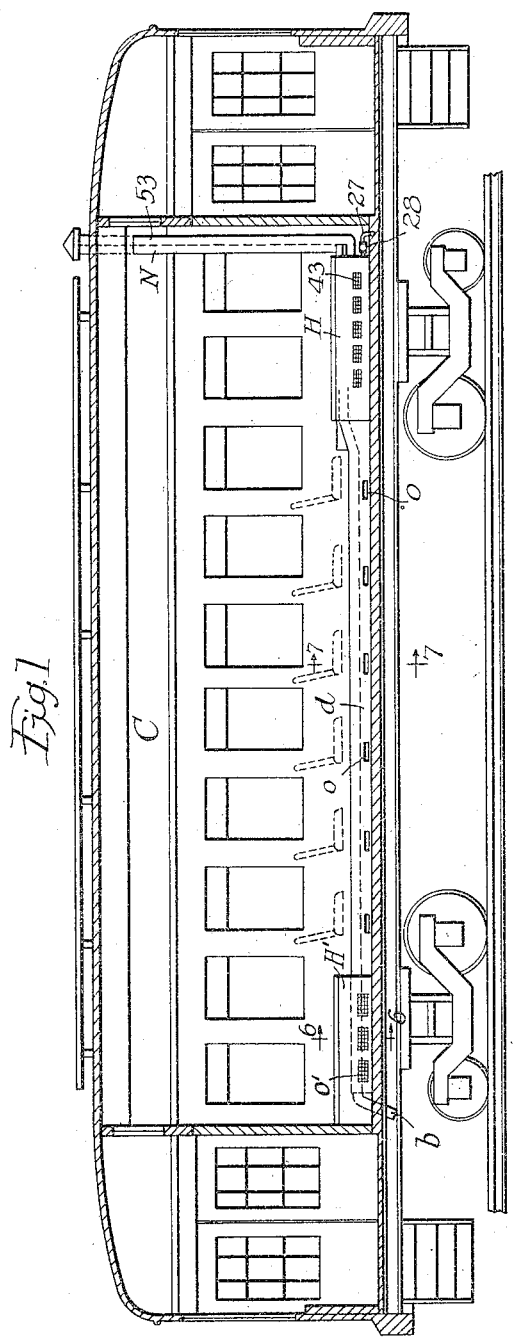
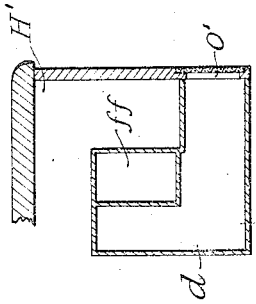
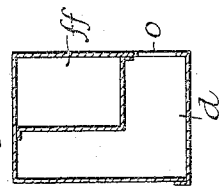
Witnesses:
Leonard W. Novauder
Inventor
Thomas H. Garland
By Charles J. Schmidt
Attys

T. H. GARLAND.
HEATING SYSTEM.
APPLICATION FILED NOV. 5, 1915.

1,243,154.

Patented Oct. 16, 1917.
4 SHEETS—SHEET 2.

Witnesses:
Leonard W. Novander

Inventor
Thomas H. Garland
By Charles J. Schmidt
Att'ys

T. H. GARLAND.
HEATING SYSTEM.
APPLICATION FILED NOV. 5, 1915.

1,243,154.

Patented Oct. 16, 1917.
4 SHEETS—SHEET 3.

Witnesses:
Leonard W. Novander.

Inventor
Thomas H. Garland
By Charles J. Schmidt,
Att'ys

T. H. GARLAND.
HEATING SYSTEM.
APPLICATION FILED NOV. 5, 1915.
1,243,154.
Patented Oct. 16, 1917.
4 SHEETS—SHEET 4.
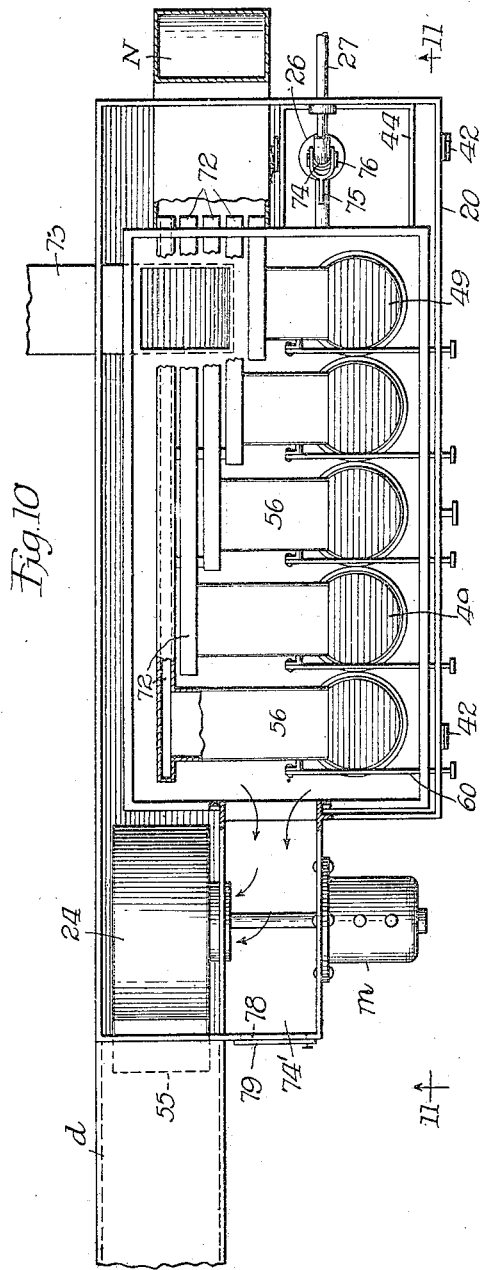
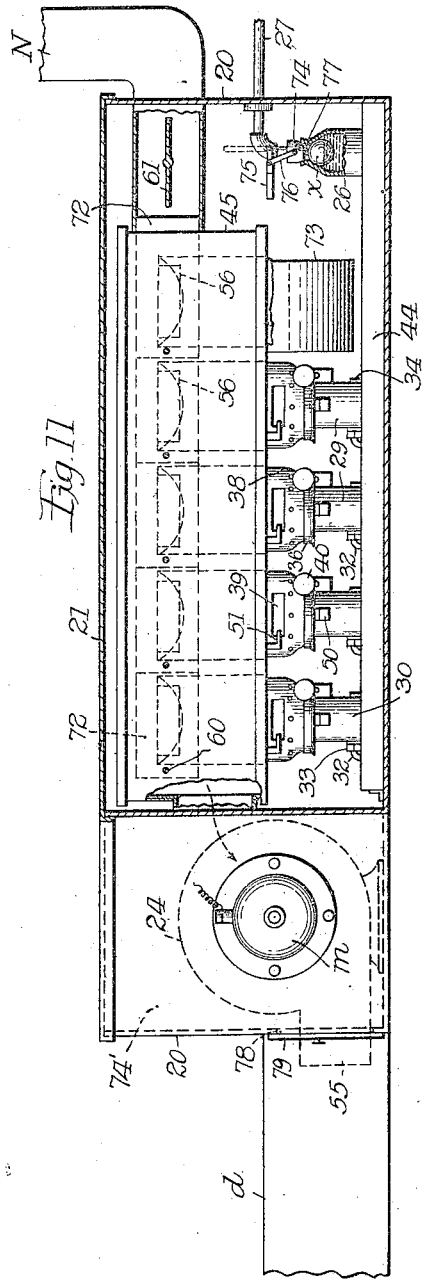
Witnesses:
Leonard W Novander.
Inventor
Thomas H. Garland
By Charles J. Schmitt.
Attys

UNITED STATES PATENT OFFICE.

THOMAS H. GARLAND, OF CHICAGO, ILLINOIS.

HEATING SYSTEM.

1,243,154. Specification of Letters Patent. Patented Oct. 16, 1917.

Application filed November 5, 1915. Serial No. 59,740.

*To all whom it may concern:*

Be it known that I, THOMAS H. GARLAND, a citizen of the United States, and a resident of Chicago, in the county of Cook and State of Illinois, have invented certain new and useful Improvements in Heating Systems, of which the following is a specification.

My invention relates to heating systems and one of the important objects is to provide improved construction and arrangement by means of which oil can be safely, cheaply and efficiently used as a fuel for heating buildings, vehicles, particularly electric railway cars. Another object of the invention is to provide compact arrangements which will enable installation of one or more heating units and the necessary heat controlling mechanism below a car seat out of the way of passengers. Another object is to provide improved construction and arrangement for preventing smoke, obnoxious gases and other products of combustion from entering the car or room to be heated while at the same time utilizing all the available heat units. A further object is to provide natural or forced draft as may be best suited to the conditions where the heating system is installed.

The various features of construction and arrangement of my invention are clearly shown on the accompanying drawings in which—

Figure 1 is a more or less diagrammatical sectional view of an electric street car, Fig. 2 is a plan view of the heating mechanism with parts removed and broken away, Fig. 3 is a side elevational view of the heating mechanism with the inclosing housings in section on plane 3—3, Fig. 2.

Fig. 6 is an enlarged sectional view on plane 6—6, Fig. 1,

Fig. 7 is an enlarged sectional view on plane 7—7, Fig. 1,

Fig. 10 is a plan view similar to Fig. 2 but showing a modified arrangement, and Fig. 11 is a side elevational view in section on plane 11—11, Fig. 10.

Figure 4:
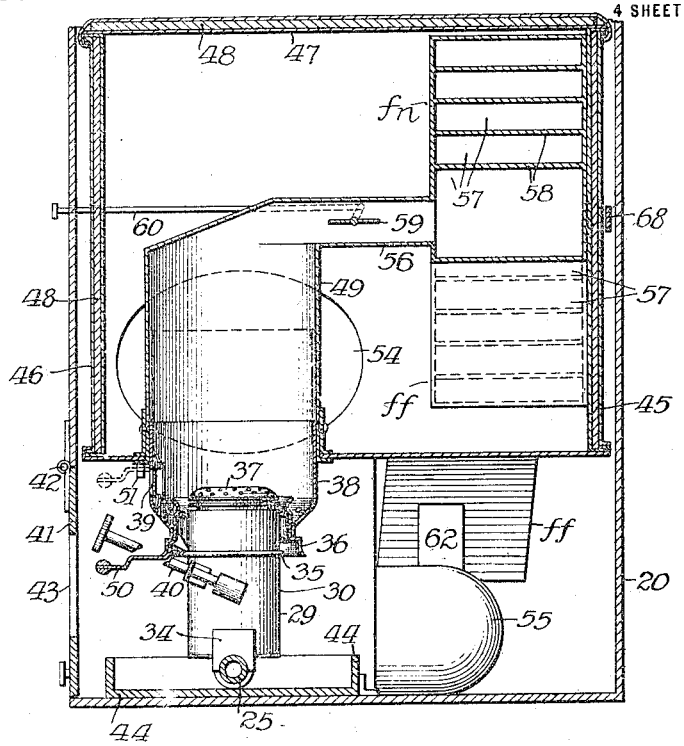
Fig. 4 is a sectional view on plane 4—4, Fig. 3.
Figure 5:
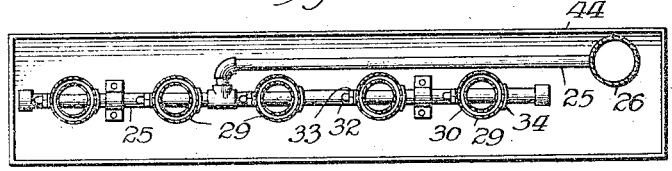
Fig. 5 is a sectional view on plane 5—5, Fig. 3.
Figure 8:
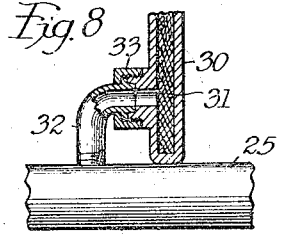
Fig. 8 is an enlarged sectional view of part of the lower end of a burner body showing its connection with an oil supply pipe.
Figure 9:
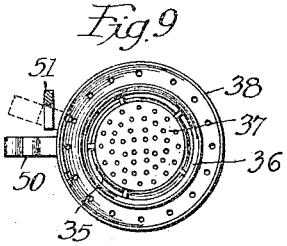
Fig. 9 is a plan view of a burner unit together with hook mechanism for supporting the chimney thereof in upper position.

I have shown my improved system applied to heating electric cars. In Fig. 1 is shown a car C of ordinary construction and arrangement in which my improved heating mechanism H is located under one of the longitudinal end side seats of the car, a distributing pipe $d$, having the outlets $o$, extending from the heating mechanism along the side of the car to the opposite end of the car. Referring to Figs. 2 to 9, the heating mechanism is inside of the rectangular housing 20 from which the distributing duct or pipe $d$ leads. One corner of the housing is partitioned off by the wall 22 to form the compartment 23 for a circulation producing device such as an electric blower 24. Extending along the bottom of the housing near the front thereof is an oil feed pipe 25 leading from a float valve structure 26 which receives oil supply from a pipe 27 leading from a suitable tank. In Fig. 1 the pipe 27 is shown leading through the floor of the car to a tank (not shown) which may be placed under the opposite end seat. The flow of oil from the tank through the pipe 27 is preferably controlled by a needle valve located at the tank end of the pipe which allows air to bubble up in the oil tank as the oil is fed to the burners. A hand valve 28 may also be provided.

Mounted on the pipe 25 are one or more oil burner structures 29, five being shown. These burners may be of any desired construction. As best shown in Figs. 4, 5, 8 and 9, each burner comprises an annular body 30 having the annular wick chamber 31, each chamber being connected with the pipe 25 by means of a nipple 32 and a coupling 33. Each burner body has also a plate 34 extending therefrom and straddling the pipe 25, each burner body being thus rigidly supported in upright position on the pipe 25. Each burner body has also the peripheral ledge 35 on which is mounted a chimney base 36, and within the upper end of the body is the air distributing cap and flame spreader 37. Mounted on each chimney base is a lower chimney section 38 which has in its front the glazed sight opening 39 through which the flame may be inspected, the wick being adjustable up and down by means of the stem 40 which terminates in wick-engaging wheels which are not shown but which are of the ordinary construction and operation. The lower front part of the housing 20 is in the form of a door 41 hinged at 42 and having a grated air inlet opening 43 in front of each heat producing unit. The pipe 25 and the float valve 26 are preferably arranged in a drip pan 44.

Within the housing 20 above the burners of the heat producing units is a heat drum 45 having preferably double side and top walls 46 and 47 respectively with interposed heat insulating material 48. Above each burner structure an upper chimney section 49 passes vertically through the drum but these chimney sections do not communicate with the drum. The lower chimney sections 38 of the burner structures telescope into these upper chimney sections, this being clearly shown in Fig. 4. Each chimney base 36 has an arm 50 extending forwardly therefrom, and depending from the lower wall of the drum 45 are hooks 51, one for each lever. By means of the lever or handle 50 each chimney base can be readily raised upwardly above the top of the burner body, and then the raised structure is swung a distance laterally until the lever 50 engages the corresponding hook 51 (dotted lines Figs. 4 and 9.) When the chimney parts are thus raised away from the burner body inspection is easy. Ready access to the burner structures is also desirable in order that cleaning, adjusting or removal can be better accomplished. As already referred to, the supply pipe 25 together with the burner structures supported thereon is contained in the pan 44. As shown in Fig. 3, a coupling or union 52 is provided in the supply pipe 27 just above the float valve structure 26 and when this union is opened, and the levers 50 are shifted and the chimney bases 36 with the lower chimney sections 38 raised and locked in raised position, the pan 44 with the burner structures and float valve structure therein is free to be slid from the housing through the door-way of the door 41. The burners can then be readily cleaned, adjusted and the wicks trimmed or renewed. Of course, before opening of the union 52 the hand valve 28 is closed to shut off flow of oil. When the pan with the burner structures is again inserted into the housing the union is closed and the valve 28 opened, and the float ball $x$ coöperating with the conical top $y$ of the structure 26 will then automatically control the flow of oil.

The chimney sections 49 and the air within the drum 45 are highly heated when the heating devices are burning, and in order to distribute this heat through the car an air inlet pipe 53 is provided for the drum at one end and the other end is connected with the intake funnel 54 of the blower 24, the outlet end 55 of the blower extending into the distributing duct $d$. The air intake duct 53 communicates with atmosphere at the exterior of the car in order that fresh air may be taken in, and as shown in Fig. 1, the duct extends upwardly through the car roof. When the blower is operating fresh air is drawn through the duct 53 and into the drum 45 to be there heated, and the heated air is then delivered by the blower to and forced through the duct $d$ to be distributed to the car through the duct outlets $o$, and the outlets $o'$ under seat H'.

As before stated, the chimney sections 49 do not communicate with the drum but flue outlet is provided for the products of combustion. A flue stack N leads upwardly through the car roof alongside the air inlet pipe 53 as shown in Fig. 1, and from this stack a flue section $fn$ extends into the drum 45 and connects with each one of the chimney sections 49 through a connection 56. In order to equalize the pull of the stack on the burner structure chimneys the flue section $fn$ is subdivided into flue passageways 57 by partitions 58, each flue passageway connecting at its inner end with one of the chimney connections 56. The heated products of combustion can thus readily travel upwardly to be drawn through the stack N. In order to regulate the draft through the burner structures and chimneys each connection 56 is provided with a damper 59 controllable from the front of the housing 20 by means of a rod 60. I also provide a main damper 61 at the base of the stack N.

Where the products of combustion flow directly to the atmosphere through the stack N considerable available heat may be lost, and in order to utilize all the heat I connect a flue section $ff$ with the chimney connections 56 and pass this flue section through the distributing duct $d$ so that the air flowing through the duct around the flue section $ff$ may extract heat from the products of combustion, the flue, as illustrated in Fig. 1, deflecting at its end $b$ downwardly through the car floor to discharge the smoke, gases and exhaust products into the atmosphere. As the flue branch $ff$ is below the connections 56 provision must be made for creating sufficient draft to cause circulation of the products of combustion. As shown, I provide for forced draft through this flue by extending a pipe 62 from the outlet 55 of the blower 24 into the flue. This pipe extends merely into the pipe of the blower outlet and is of a diameter to receive only a fraction of the air discharged by the blower, and this air is directed into the flue branch $ff$, the pipe 62 acting practically like an injector to produce circulation, fresh air entering through the gratings 43 and passing upwardly through the burner bodies to supply oxygen for the wick flames, the products of combustion being then forced through the flue $ff$ to be finally discharged into atmosphere. In order to equalize the pull or draft on the burner structures the flue section $ff$ is at its inner end sub-divided into flue passageways 63 by partitions 64, each passageway communicating with one of the chimney connections 56. A main damper 65 is also provided for the flue section $ff$.

When the forced draft is in operation the natural draft outlet to the stack N should be closed and when the natural draft is effective the forced draft should be shut off. This can be very readily accomplished by means of the dampers 61 and 65. When the heating mechanism is used in electric cars the blower will of course be driven electrically and I then preferably provide for automatically controlling the dampers. As shown, the motor $m$ of the blower is connected by the circuit $c$ with the car circuit C, a switch $s$ being provided for the circuit $c$. Included serially in the circuit $c$ is the solenoid $t$ whose core $u$ connects with the lever 66 on the supporting shaft 67 of the damper 65. The lever 66 is connected by rod 68 with arm 69 extending from the shaft 70 of the damper 61. When the switch $s$ is closed and the trolley pole or contact shoe of the car is in connection with the electrical supply conductor, the motor 24 will operate and the solenoid $t$ will be energized and its core drawn inwardly, and the lever arrangement described will operate to open the forced draft damper 65 and to close the natural draft damper 61. Should the circuit $c$ be accidentally opened, as by disconnection of the trolley pole or contact shoe, the blower will stop and the solenoid $t$ will become deenergized and the switch will be shifted by the springs 71 to effect closure of damper 65 and opening of the damper 61, and the products of combustion will then flow upwardly through the branch $fn$ and through the stack N. When the blower stops forced draft through the duct $d$ will also stop. However, the duct 53 which acts as an air intake when the blower is running will, when the blower stops, act as a stack. In other words, the circulation through the drum 45 is reversed, air flowing through the openings $o$ in the duct $d$ and through the blower and funnel 54 into the drum 45 and up through the duct 53. This circulation through the drum will prevent the accumulation or concentration of heat in and around the housing 20 which is of course being used for seating purposes.

It may be desirable to cut off the forced flue draft and use only the natural draft even when the blower is operating. To accomplish this I provide a resistance $r$ and a switch $v$ by means of which this resistance can be included in the circuit $c$ in place of the solenoid $t$. In Fig. 2 the full lines show the switch in position to connect the solenoid in series with the motor $m$ and the dotted lines show the switch in position to disconnect the solenoid and to substitute the resistance $r$, and during this substitution the solenoid will be deënergized and the forced draft damper 65 will be closed and the natural draft damper 61 will be open, but the blower will continue to operate to force heated air from the drum through the distributing duct $d$. With the flue branch $ff$ closed the direct heat from the burners will flow directly to the exterior of the car through the stack N and less heat will be delivered to the car. Further reduction of heat delivery can of course be made by turning down the wicks of the burners. A great range of adjustment for the desired heating is thus available, and the available heat can be used to the greatest advantage and with maximum efficiency with a minimum supply of oil. The effect of the injector part 62 on the forced draft flue is such as to assure sufficient air supply to the burners through the gratings 43, and the rapid expulsion to the exterior of the car of any obnoxious gases, and smoke if there should be any.

In Figs. 10 and 11 is shown a somewhat modified arrangement which is very efficient where forced draft through the burners is unnecessary or undesirable. As shown, each chimney section 56 leads into an individual sub-flue 72, these sub-flues extending through the drum 45 and discharging into the stack N controlled by the damper 61. The flues extend parallelly but are separated by air spaces for the circulation of air therebetween. The air intake pipe 73 for the drum 45 extends from the side of the car and opens upwardly into the drum below the sub-flues 72 so that the incoming air flows upwardly around and between the flues to extract heat from the products of combustion before they escape into the stack and the heated air flows from the drum through the passageway 74′ into the inlet of fan 24 whose outlet is in the distributing duct $d$. The driving motor $m$ for the fan may, as shown, be mounted on the exterior of the housing 20 to be insulated from the heat.

In Figs. 10 and 11 I also show a modified arrangement for connecting the oil flow valve structure 26 with the delivery pipe 27 in order that ready disconnection may be effected to permit ready withdrawal of the pan 44 from the housing. The connection involves a valve frame 74 vertically shiftable by means of lever 75 and link 76. The valve frame has conical sides to fit into the neck of the container 26. The valve frame has connection with the pipe 27 and within the frame is a valve whose stem 77 projects downwardly to coöperate with the float $x$ in such manner that when the oil supply is sufficient the float will engage the stem to raise the valve into closed position, and when the oil supply is insufficient the float will drop to permit opening of the valve. When it is desired to remove the pan 44 with the structure 26 and the burner units, the lever 75 is raised to withdraw the frame 74 from the structure 26, the valve then automatically closing to shut off further flow of oil.

In the arrangement of Figs. 10 and 11 the blower may be caused to stop, either intentionally, or accidentally as by opening of the electric control circuit of the driving motor M. When the blower is disconnected provision is preferably made for preventing concentration of heat under the seat structure, the air inlet 73 entering into the drum from below being unable to allow the accumulated heat to escape. I have shown an opening 78 at the end of the passageway 74' provided with a door 79. When the blower is operating this door is closed but when the blower stops the door is opened to permit the generated heat to flow into the car through the opening 78.

I thus provide a heating system which is simple, compact and efficient, and adaptable for heating cars and buildings. Smoke and obnoxious gases or vapors are prevented from entering the car or building and are delivered to the car exterior only after all heat has been extracted therefrom. The improved damper control will automatically open the natural draft outlet when the blower stops and will close it when the blower is operating. An abundance of fresh air is fed to the burners of the heating units and efficient combustion is at all times assured.

I do not of course desire to be limited to the exact constructions, arrangements and operations shown and described as modifications are no doubt possible which would still come within the scope of the invention.

I claim as follows:

1. In a heating system, the combination of a heat producing combustion unit, a drum surrounding said unit but closed against the products of combustion, an air inlet to said drum, a distributing pipe, a circulation producing device having its intake end connected with the drum and its outlet end connected with said distributing pipe whereby air is drawn through said drum to be heated and forced through said distributing pipe, a flue extending through said distributing pipe and connected with said heat producing unit to receive the products of combustion, and a connection between said flue and circulating device outlet whereby air is forced through said flue in a direction away from said heating unit in order to create forced draft through said unit.

2. In a heating system, the combination of a heat producing combustion unit, a frame surrounding said unit but closed to the products of combustion, air inlet to said frame, a delivery pipe extending from said frame to receive the heated air therefrom, a flue from said heat producing unit for the products of combustion, a circulation producing device connected with said delivery pipe and flue, a natural draft outlet for said flue, a damper for closing said flue against said circulating device, and means for opening said natural draft outlet when said damper is closed.

3. In a heating system, the combination of a heat producing combustion unit, a frame surrounding said unit but closed to the products of combustion, air inlet to said frame, a delivery pipe extending from said frame to receive the heated air therefrom, a flue from said heat producing unit for the products of combustion, a circulation producing device connected with said delivery pipe and flue, a damper for closing said flue against said circulation producing device, a natural draft outlet for said flue, and means for automatically closing said outlet when said damper is open and for opening said outlet when the damper is closed.

4. In a heating system, the combination of a heat producing combustion device, a flue for products of combustion having a natural draft branch extending upwardly and a forced draft branch extending downwardly, a draft forcing device connected with said downwardly extending branch, a damper for the natural draft branch and a damper for the forced draft branch, and means for automatically opening the natural draft damper when said forced draft damper is closed and for closing said natural draft branch when the forced draft damper is open.

5. In a heating system, the combination of a heat producing combustion device, a flue for products of combustion, a natural draft outlet branch for said flue and a forced draft outlet branch therefor, an electrically operated blower for forcing air through said forced draft branch in a direction away from said heat producing device, a damper for each flue branch, a circuit for said blower, an electric operating device included in said circuit and connected with said dampers, said forced draft branch being opened and said natural draft branch being closed by said electric operating device when current is delivered to said blower and said blower is operating, and said forced draft damper being closed and the natural draft damper being opened by said operating device when said circuit is opened and the blower stops.

In witness whereof I have hereunto set my hand this 2nd day of November, A. D., 1915.

THOMAS H. GARLAND.

Witnesses:
CHARLES J. SCHMIDT,
LURLINE BULLWINKEL.

Copies of this patent may be obtained for five cents each, by addressing the "Commissioner of Patents, Washington, D. C."